US010291828B1

(12) United States Patent
Hsu et al.

(10) Patent No.: US 10,291,828 B1
(45) Date of Patent: May 14, 2019

(54) SCALABLE THREE-DIMENSIONAL, 360-DEGREE VIRTUAL REALITY CAMERA SYSTEM

(71) Applicant: Facebook, Inc., Menlo Park, CA (US)

(72) Inventors: Joyce Hsu, Oakland, CA (US); Jussi Antero Timonen, Burbank, CA (US); James Gilbert Ammon, San Jose, CA (US); Oscar Karlsson, Stockholm (SE); Casper Asmussen, Malmo (SE); Felix Antoine, Stockholm (SE); Andrew Hamilton Coward, State College, PA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/947,262

(22) Filed: Apr. 6, 2018

Related U.S. Application Data

(60) Provisional application No. 62/485,358, filed on Apr. 13, 2017.

(51) Int. Cl.
  *H04N 5/225* (2006.01)
  *H04N 5/247* (2006.01)
  *H04N 13/243* (2018.01)

(52) U.S. Cl.
  CPC ......... *H04N 5/2252* (2013.01); *H04N 5/2253* (2013.01); *H04N 5/2258* (2013.01);
  (Continued)

(58) Field of Classification Search
  CPC .. H04N 5/2252; H04N 5/2253; H04N 5/2258; H04N 5/2259; H04N 5/247; H04N 13/243; H04N 13/204; H04N 13/25
  See application file for complete search history.

(56) References Cited

U.S. PATENT DOCUMENTS

| 9,479,697 | B2 * | 10/2016 | Aguilar | H04N 5/23238 |
| 10,057,487 | B1 * | 8/2018 | Chen | H04N 5/23238 |

(Continued)

OTHER PUBLICATIONS

Dove, J., "Lytro takes a giant leap into video with the Immerge VR video cam," Nov. 5, 2015, four pages. [Online] [Retrieved Jun. 4, 2018] Retrieved from the internet <https://www.macworld.com/article/3001676/videos/lytro-takes-a-giant-leap-into-video-with-the-immerge-vr-video-cam.html>.

(Continued)

*Primary Examiner* — Nelson D. Hernández Hernández
(74) *Attorney, Agent, or Firm* — Fenwick & West LLP

(57) ABSTRACT

A scalable three-dimensional (3D), 360-degree camera system is configured to capture images and/or video across 360 degrees of a local area. The camera system includes a plurality of cameras that are coupled to a spherical inner core, which is enclosed within an exterior shell composed of several segments. The exterior shell segments include apertures that align with each camera, and an interior shell component is concentrically aligned with each aperture. The configuration of the exterior shell segments and the interior shell components protect the camera assembly from physical damage and the environment and additionally improve heat dissipation from internal components of the camera system. Design parameters of the camera system can be determined to adjust the number of cameras, the size of the inner core, the positioning of the cameras on the inner core, and the number and configuration of the segments of the interior and exterior shell.

20 Claims, 6 Drawing Sheets

(52) U.S. Cl.
CPC ........... *H04N 5/2259* (2013.01); *H04N 5/247* (2013.01); *H04N 13/243* (2018.05)

(56) References Cited

U.S. PATENT DOCUMENTS

| | | | | |
|---|---|---|---|---|
| 2007/0206945 | A1* | 9/2007 | DeLorme | G03B 41/00 396/332 |
| 2012/0154521 | A1* | 6/2012 | Townsend | H04N 5/23238 348/36 |
| 2014/0132788 | A1* | 5/2014 | Ramsay | H04N 5/23238 348/218.1 |
| 2016/0349599 | A1* | 12/2016 | Macmillan | G03B 17/561 |
| 2017/0187956 | A1* | 6/2017 | Fink | H04N 5/23206 |
| 2017/0331986 | A1* | 11/2017 | Houba | H04N 5/2253 |

OTHER PUBLICATIONS

Eva, K., "Project Beyond Gets Reborn as the Samsung 360 Round," Nov. 25, 2017, eight pages. . [Online] [Retrieved Jun. 4, 2018] Retrieved from the internet <https://www.vrfocus.com/2017/10/project-beyond-gets-reborn-as-the-samsung-360-round/>.

Google Inc., "Jump" Date Unknown, six pages. [Online] [Retrieved Jun. 1, 2018] Retrieved from the internet <https://vr.google.com/jump/>.

Gopro, Inc., "Odyssey," Date Unknown, four pages. [Online] [Retrieved Jun. 1, 2018] Retrieved from the internet <http://shop.gopro.com/odyssey>.

Jaunt VR, "Jaunt ONE," Date Unknown, six pages. [Online] [Retrieved Jun. 1, 2018] Retrieved from the internet <https://www/jauntvr.com/technology/jaunt-one/>.

Savvides, L., "We took the $40,000 Nokia Ozo camera for a spin (hands-on)," Apr. 19, 2017, seven pages. [Online] [Retrieved Jun. 4, 2018] Retrieved from the internet <https://www.cnet.com/products/nokia-ozo/preview/>.

* cited by examiner

SCALABLE THREE-DIMENSIONAL, 360-DEGREE VIRTUAL REALITY CAMERA SYSTEM

CROSS REFERENCE TO RELATED APPLICATIONS

This application claims the benefit of U.S. Provisional Application No. 62/485,358, filed Apr. 13, 2017, which is incorporated by reference in its entirety.

BACKGROUND

The disclosure relates generally to camera assemblies, and more specifically to scalable three-dimensional (3D), 360-degree camera systems for virtual reality systems.

Virtual reality systems capture images and/or video of an environment with one or more cameras. The images and/or video captured by the cameras are reconstructed to create a virtual reality that a user can interact with. The configuration of the one or more cameras impacts the quality of the images captured and the ability to reconstruct the images for a seamless virtual reality experience. Since a virtual reality system may use several cameras capturing images and/or video at once, the system can produce a significant amount of heat during use. The heat can be difficult to properly dissipate and may cause expansion of internal components, which may affect the calibration of the one or more cameras and adversely affect a user's virtual reality experience. In addition, virtual reality systems may be used for a variety of purposes by individuals, small groups of people, or large organizations. Accordingly, there is a need for a virtual reality system that can be appropriately scaled and customized for its purpose.

SUMMARY

An embodiment of the camera system comprises a plurality of outer shell segments having a curvature and configured to mate with each other along mating edges. The mated outer shell segments form a spherical exterior around a camera assembly that includes a plurality of cameras, wherein each of the plurality of cameras has a field of view that faces away from a center region of the camera assembly and adjacent cameras have overlapping fields of view. Each outer shell segment comprises a plurality of apertures that each align with a corresponding camera of the plurality of cameras. Each outer shell segment further comprises a plurality of inner shell segments, wherein each inner shell segment is concentrically aligned with a respective aperture and a corresponding camera, and each inner shell segment comprises an outer diameter that is wider than a diameter of the respective aperture. The inner shell segment is attached to the outer shell segment about the perimeter of the aperture in a manner that forms an offset between the inner shell segment and an internal surface of the outer shell segment. Each outer shell segment additionally comprises a mounting pin interface on the internal surface of the outer shell segment, wherein the mounting pin interface is configured to secure to a respective mounting pin protruding from the camera assembly. One or more joint connectors are positioned along the mating edges of the outer shell segment, wherein each joint connector is configured to mate with and secure to at least one joint connector of an adjacent outer shell segment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

A scalable three-dimensional (3D), 360-degree camera system is configured to capture images and/or video across 360 degrees of a local area, at least a portion of which is in stereo. The camera system includes a plurality of cameras that are coupled to a substantially spherical inner core forming a camera assembly. The cameras in the camera assembly are positioned to capture a 360 degree view of the local area. Some or all of adjacent cameras have overlapping fields of view such that it can capture data in stereo. The captured images are processed (e.g., within the camera system and/or at a server) to generate three dimensional, 360 content. The 3D-360 degree content is media content (e.g., an image, a video, audio information, or some combination thereof) associated with a 360 degree field of view of the camera system and which may be rendered in 3D.

The camera assembly is enclosed within an exterior shell composed of several segments. The camera system additionally includes interior shell components. The configuration of the exterior shell and the interior shell components protect the camera assembly from physical damage and the environment. Additionally, the exterior shell and interior shell components are configured to improve heat dissipation from internal components of the camera system. Design parameters of the camera system can be determined to adjust the number of cameras, the size of the inner core, the positioning of the cameras on the inner core, and the number and configuration of the segments of the interior and exterior shell, among other features of the camera system.

Figure 1:
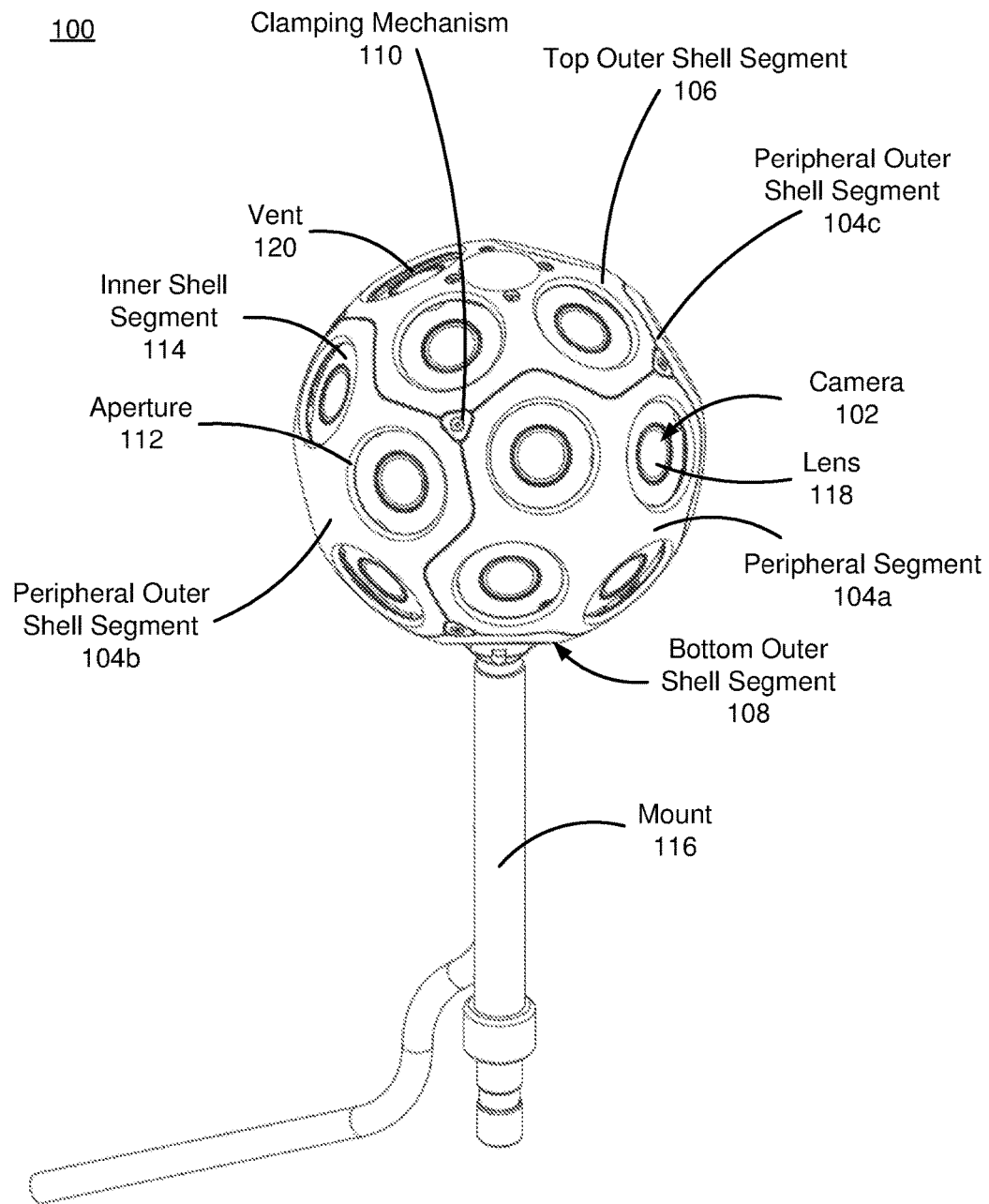
FIG. 1 illustrates an isometric view of a scalable virtual reality camera system, according to an embodiment.

FIG. 1 illustrates an isometric view of a virtual reality camera system 100, according to an embodiment. The camera system 100 captures images and/or audio information of a local area surrounding the camera system 100. The camera system 100 comprises an assembly of cameras positioned to capture a 360 degree view of the local area. In some embodiments, the camera system 100 may be part of a larger system that connects the camera system 100 to one or more user devices, to a data store, and to a processing server via a network as described in U.S. patent application Ser. No. 15/096,140, which is hereby incorporated by reference in its entirety. Some embodiments of the camera system 100 have different components than those described here. Similarly, in some cases, functions can be distributed among the components in a different manner than is described here.

The local area is the environment that surrounds the camera system 100. For example, the local area may be a room that the camera system 100 is inside, or the camera system 100 may be outside and the local area is an outside area that is visible to the camera system 100. Image information is information output by the camera system 100. Image information may include, e.g., one or more images, audio information (e.g., sounds captured by one or more microphones), video information, metadata, or some combination thereof. Metadata is additional information associated with the image information. Metadata may include, e.g., frame rate, exposure settings (e.g., shutter speed, gain, etc.), copyright information, date/time information, camera identifier, names, labeling, some other information associated with the image information, or some combination thereof. In some embodiments, the camera system 100 is configured to send the image information to a processing server via a network. In alternate embodiments, the camera system 100 is configured to process the image information to form 3D-360 degree content.

The camera system 100 may receive instructions from a user to capture image information of the local area. For example, a web server may allow users to control the camera system 100 using, e.g., a web-enabled browser on a user device via a network. The camera system 100 determines a global exposure setting (e.g., gain, shutter speed, aperture) using information from one or more cameras in the camera assembly 100, and applies the global exposure setting to all of the cameras in the camera system 100. Accordingly, each camera, regardless of a light metering specific to that camera, uses the global exposure settings. The camera system 100 synchronizes the capture of the image information using a global shutter that causes all of the cameras in the camera system 100 to take an exposure (using the global exposure setting) at the same time. Accordingly, both exposure and time a frame is taken are consistent across all of the image information.

In the embodiment of FIG. 1, the camera system 100 comprises a plurality of cameras 102 fixed to an inner core (shown in FIG. 2) and enclosed within a plurality of outer shell segments: peripheral segments 104a, 104b, 104c (104d not shown), a top segment 106, and a bottom segment 108. The outer shell segments 104a, 104b, 104c, 104d, 106, 108 are connected at a joint between the outer shell segments via a clamping mechanism 110. Each outer shell segment 104a, 104b, 104c, 104d, 106, 108 comprises a plurality of apertures 112, each aligned with a lens of a camera 102. Each aperture 112 exposes an inner shell segment 114 that surrounds a lens of each camera 102. While the embodiment of FIG. 1 includes 24 cameras, the configuration of the camera system 100 is scalable to allow any number of cameras 102 to be included, and the dimensions of the outer shell segments 104a, 104b, 104c, 104d, 106, 108 may be scaled proportionally to accommodate the number of cameras 102. The camera system 100 can be mounted to a mount 116 that allows the camera system 100 to be positioned within an environment.

The plurality of cameras 102 are configured to capture images and/or video of a 360 degree view of the local area. As illustrated in FIG. 1, the plurality of cameras 102 are positioned such that a field of view of each camera 102 is directed away from a center region (such as the inner core shown in FIG. 2) of the camera system 100. The plurality of cameras 102 are arranged such that an optical axis of each camera 102 is in a different direction from the other cameras 102 to capture a 360 degree view of the local area. At least a portion of the plurality of cameras 102 are arranged such that some or all of adjacent cameras produce stereo images of the local area. Note that FIG. 1 shows an example angle of orientation for each of the cameras 102 illustrated and in other embodiments one or more of the cameras 102 may be oriented in different directions.

A camera 102 includes a sensor (not shown), a lens 118, and a camera controller (not shown). The sensor is an electrical device that captures light using an array of photosensitive pixels, wherein each pixel converts light into an electronic signal. Sensors can have varying features, such as resolution, pixel size and sensitivity, light sensitivity, type of shutter, and type of signal processing. The lens 118 is one or more optical elements of a camera that facilitate focusing light onto the sensor. A field of view ranging from ~50 to 120 degrees is generally referred to as a wide field of view (WFOV), and a field of view larger than 120 degrees is generally referred to as a fish eye field of view. In the embodiment of FIG. 1, the lens 118 is a lens that has a WFOV. The lenses 118 are configured to have wide coverage of the local area and provide sufficient overlap between fields of view of the cameras 102 such that high quality 3D-360 degree images can be created. Lenses have features that can be fixed or variable, such as the focus and the aperture, may have varying focal lengths, and may be covered with an optical coating. Some embodiments may have lenses that are interchangeable, such that a first lens can be removed from the camera and a second lens can be coupled to the camera. In some embodiments, the camera 102 may have a microphone to capture audio information. The microphone can be located within the camera or may located external to the camera. The camera controller is able to determine exposure settings (e.g. aperture, gain, shutter) for the camera based on light incident on the sensor. In some embodiments, the camera controller acts as a principal camera, i.e. the camera controller controls a plurality of other cameras. In other embodiments, the camera controller acts as an ancillary camera, i.e. the camera controller is controlled by a second camera. The embodiments in which the cameras 102 act as ancillary cameras, the shutter and exposure settings are set globally by a principal camera.

The plurality of outer shell segments 104a, 104b, 104c, 104d, 106, 108 enclose the plurality of cameras 102 and the inner core. In the embodiment of FIG. 1, the camera system 100 comprises four peripheral outer shell segments 104a, 104b, 104c, 104d, a top outer shell segment 106, and a bottom outer shell segment 108 that are configured to mate with each other. Each outer shell segment 104a, 104b, 104c, 104d, 106, 108 has a curved form factor, which results in the camera system 100 having a substantially spherical shape. In some embodiments, the curvature and number of the outer shell segments 104a, 104b, 104c, 104d, 106, 108 may be modified to increase or decrease the size of the camera system 100 to accommodate an assembly of cameras 102 that has an increased or decreased number of cameras. In the embodiment of FIG. 1, the outer shell segments 104a, 104b, 104c, 104d, 106, 108 are substantially symmetrical which allows them to readily mate with each other. The outer shell segments 104a, 104b, 104c, 104d, 106, 108 are configured to mate with each other along an edge of the outer shell segment and to connect at a joint between the outer shell segments via a clamping mechanism 110, which will be discussed in greater detail with regards to FIGS. 4-5. Each outer shell segment 104a, 104b, 104c, 104d, 106, 108 may comprise mounting features on an internal surface of the segment to attach to the inner core of the camera system 100. The top outer shell segment 106 may be adapted to include additional support structures. Additionally, the bottom outer shell segment 108 may be adapted to couple to the mount 116 that provides standing or mounting support and stability for the camera system. The support structure can be a variety of mounts (e.g., a monopod, tripod, quadrantpod, wall mount, etc.). In some embodiments, the top outer shell segment 106 and the bottom outer shell segment 108 may have the same configuration to streamline the assembly process of the camera system 100. The outer shell segments 104a, 104b, 104c, 104d, 106, 108 may be composed of rigid materials (e.g., hard metals or plastics).

The apertures 112 are openings in the outer shell segments 104a, 104b, 104c, 104d, 106, 108 that expose a lens of a camera 102. In the embodiment of FIG. 1, each outer shell segment 104a, 104b, 104c, 104d, 106, 108 comprises four apertures 112 that are each aligned with a corresponding lens of a camera 102. The number of apertures 112 scales with the number of cameras 102 in the camera system 100, as every camera 120 is associated with a corresponding aperture. The apertures 112 may be circular, elliptical, square, rectangular, or any other regular or irregular shape. The dimensions of each aperture 112 correspond with a size of the lens of the camera 102 such that each camera 102 has an unobstructed field of view. As a diameter of the lenses 118 of the cameras 102 is constant in the embodiment of FIG. 1, a diameter of each aperture 112 is similarly constant. But, in other embodiments, the diameter of different apertures 112 may be different even if the diameter of lenses 118 associated with of the apertures is the same. In the embodiment of FIG. 1, the cameras 102 are recessed within the apertures 112 such that they do not protrude relative to the outer shell segments 104a, 104b, 104c, 104d, 106, 108, which may protect the lenses 118 from damage. The configuration may vary in embodiments with more or less cameras as the curvature of the outer shell segments 104a, 104b, 104c, 104d, 106, 108 changes.

The apertures 112 additionally expose the inner shell segment 114 surrounding each lens of a camera 102. In the embodiment of FIG. 1, the inner shell segment 114 is substantially ring-shaped, wherein the inner diameter is configured to be flush with the lens of a camera 102 and the outer diameter is slightly larger than the inner diameter of an aperture 112. The inner shell segment 114 may be secured to the lens of the camera 102, to the outer shell segments 104a, 104b, 104c, 104d, 106, 108, or to other support structures within the camera assembly 100. In this configuration, the inner shell segment 114 conceals the remainder of the camera 102, the inner core of the camera system 100, and the rest of the internal structure, thereby improving the aesthetics of the camera system 100. In some embodiments, the outer shape of the inner shell segment 114 may vary to complement the shape of the aperture 112 (e.g., circular, elliptical, square, rectangular, or any other regular or irregular shape), given that the outer dimensions of the inner shell segment 114 are wider than those of the aperture 112 to conceal the internal structure of the camera 102. The inner shell segments 114 may be composed of rigid materials (e.g., hard metals or plastics). In some embodiments, the inner shell segments 114 may be shock-absorbent to absorb any impact or forces on the camera system 100.

In addition, the inner shell segment 114 is offset from an internal surface of the outer shell segments 104a, 104b, 104c, 104d, 106, 108 to create a vent 120 between the inner shell segment 114 and the outer shell segments 104a, 104b, 104c, 104d, 106, 108. By offsetting the inner shell segment 114, this configuration creates a pathway for heat produced by components internal of the camera system 100 to escape. The vents 120 beneficially allow heat to dissipate, thereby mitigating the risk of the camera system 100 overheating and/or affecting the calibration of the cameras 102. In some embodiments, the vents 120 may be larger at the upper portion of the camera system 100 to accommodate for rising heat. For example, the inner shell segment 114 may be offset a greater distance from the internal surface of the outer shell segments 104a, 104b, 104c, 104d, 106, 108. In another example, the difference between the outer diameter of the inner shell segment 114 and the diameter of the aperture 112 may be less such that there is less overlap between the inner shell segment 114 and the outer shell segments 104a, 104b, 104c, 104d, 106, 108.

In some embodiments, the offset distance between the inner shell segment 114 and the internal surface of the outer shell segments 104a, 104b, 104c, 104d, 106, 108 may be dynamically adjustable to regulate a temperature of the camera system 100. The camera system 100 may comprise a plurality of temperature sensors that are able to detect the internal and/or external temperature of the camera system 100. Based on the data received from the temperature sensors, the camera system 100 can increase or decrease the offset distance of the inner shell segment 114 to control the amount of heat dissipation from the internal components. In some embodiments, the inner shell segment 114 may be secured to the outer shell segments 104a, 104b, 104c, 104d, 106, 108 or the inner core of the camera system 100 via a motor system that is configured to adjust the position of the inner shell segment 114. This configuration may also be beneficial in environments in which more or less protection of the internal components is required.

The camera system 100 beneficially allows a user to capture image information of a local area and construct 3D-360 degree content of the local area that may be used in, e.g., a virtual reality (VR) environment, or some other environment (e.g., augmented reality and/or mixed reality). The camera system 100 has a scalable, segmented structure, a synchronous operation, and an effective method for dissipating heat. The scalability of the camera system 100 allows a user to customize design specifications of the camera system 100 for a specific user. The segmented structure of the camera system 100 provides convenient access to internal components of the system. For example, a user may easily remove one or more of the outer shell segments 104a, 104b, 104c, 104d, 106, 108 to access the internal components of the system. The synchronicity of the plurality of cameras allows for global settings to be applied to each camera and improves the quality of the image information captured, which, in turn, improves the quality of the 3D-360 degree content that is constructed. The method for heat dissipation prevents the camera system 100 from overheating and/or affecting the calibration of the camera system 100.

Figure 2:
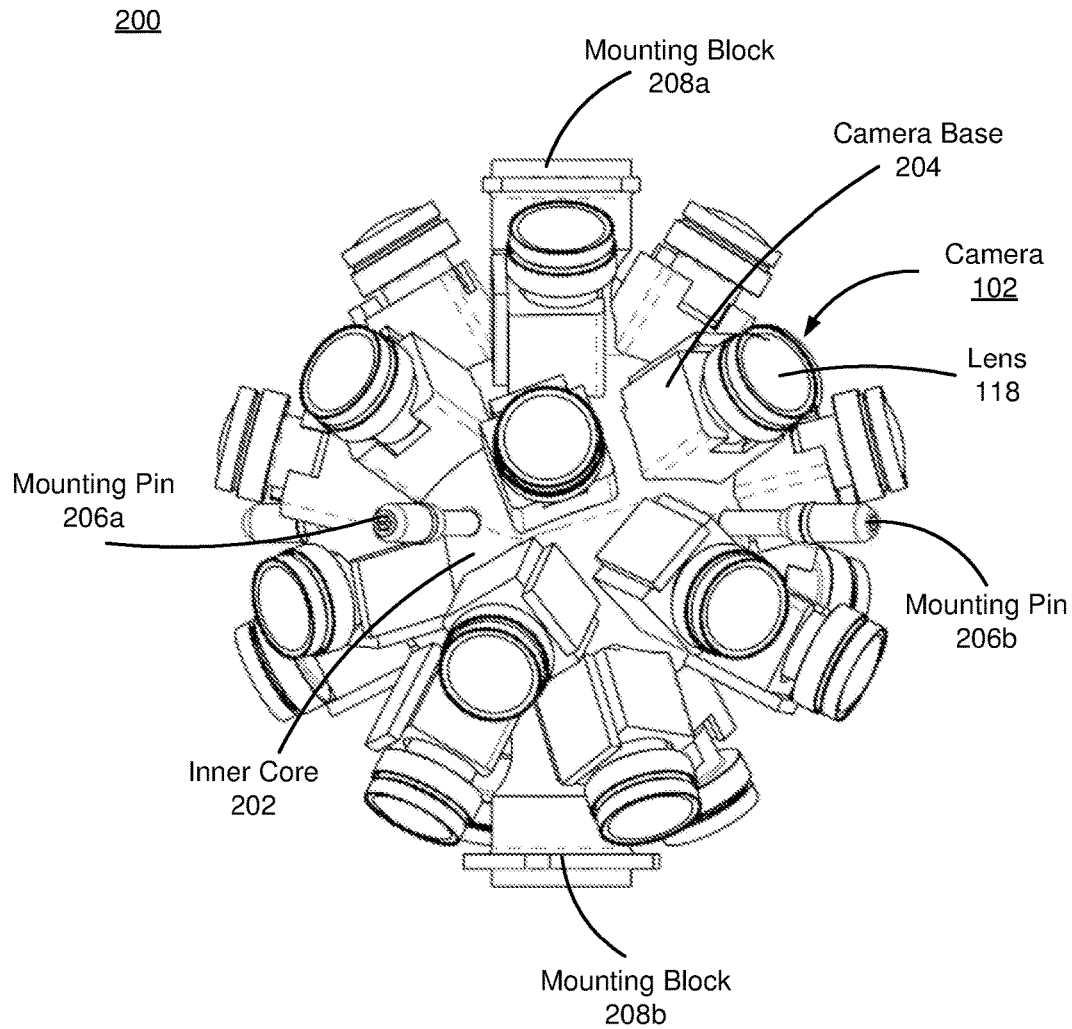
FIG. 2 illustrates a straight-on orthographic view of a camera assembly of the camera system, according to an embodiment.

FIG. 2 illustrates a straight-on orthographic view of a camera assembly 200 of the camera system 100, according to an embodiment. The camera assembly 200 illustrates the internal components of the camera system 100 with the outer shell segments 104a, 104b, 104c, 104d, 106, 108 removed. An inner core 202 provides a rigid structure for securing the plurality of cameras 102 in a specific position and orientation and secures the outer shell segments 104a, 104b, 104c, 104d, 106, 108 to the camera assembly 200. In the embodiment of FIG. 2, the camera assembly 200 comprises the inner core 202, a plurality of camera bases 204, four mounting pins 206a, 206b (206c, 206d not shown), and two mounting blocks 208a, 208b.

The inner core 202 is a support structure for the internal and external components of the camera system 100. In the embodiment of FIG. 2, the inner core 202 is substantially spherical. This configuration allows the plurality of cameras 102 to be arranged substantially perpendicular to the surface of the inner core 202 at different positions about the inner core 202 and result in having an optical axis of each camera 102 in a different direction from the other cameras 102, thereby enabling the camera system 100 to capture a 360 degree view of the local area. The inner core 202 may have a plurality of securing mechanisms about its surface or may be hollow and have small openings through which securing mechanisms can pass to attach components to the inner core 202. In some embodiments, electronics may be housed within the inner core 202 (e.g., power supply, processing server, web server, etc.). The inner core 202 may be composed of rigid materials (e.g., hard metals). The rigidity of the camera system 100 prevents the plurality of cameras 102 from moving with respect to each other once each camera 102 has been aligned and calibrated, making it easier to process the image information and fuse the images together to construct the 3D-360 degree content.

The plurality of camera bases 204 secure the plurality of cameras 204 to the inner core 202. In the embodiment of FIG. 2, the camera system 100 includes 24 cameras 102, and each camera 102 has a respective camera base 204. Each camera base 204 is configured such that a lens of a camera 102 attached to the camera base 204 has a field of view that is directed away from the inner core 202 of the camera system 100. The camera bases 204 may be secured to the inner core 202 via a securing mechanism on a bottom surface of the camera base 204. In some embodiments, the inner core 202 may have integrated securing mechanisms or may have small openings through which securing mechanisms can pass. For example, threaded hardware may pass through an opening in the inner core 202 and abut an internal surface of the inner core 202 to protrude out of the inner core 202. In this configuration, the camera base 204 can be secured to the protruding portion. Additionally, cabling (e.g., electrical wires, optical fibers, electrical cable, other types of communication and/or power lines) may run from the camera 102 through the camera base 204 and through the inner core 202 to connect to a processing server for data transfer and control signals. In some embodiments, the camera bases 204 may be integrated with the inner core 202.

The plurality of mounting pins 206a, 206b, 206c, 206d are each configured to secure to an outer shell segment 104. In the embodiment of FIG. 2, the camera assembly 200 comprises a mounting pin 206a, 206b, 206c, 206d for each outer shell segment 104a, 104b, 104c, 104d. Each mounting pin 206a, 206b, 206c, 206d extends a certain distance from the inner core 202 such that an attached outer shell segment 104a, 104b, 104c, 104d is appropriately positioned relative to each camera 102. In some embodiments, the outer shell segment 104a, 104b, 104c, 104d is positioned such that an edge of the lens 118 is substantially flush with the inner shell segment 114. The mounting pins 206a, 206b, 206c, 206d may be configured as a male or a female securing interface that mates with a reciprocal female or male securing interface on an internal surface of the outer shell segment 104. The securing interface of the outer shell segment 104a, 104b, 104c, 104d is discussed in greater detail with regards to FIG. 3. In some embodiments, the mounting pins 206a, 206b, 206c, 206d may or may not secure the outer shell segment 104a, 104b, 104c, 104d in such a way that orientation of the outer shell segment 104a, 104b, 104c, 104d is constrained once secured. The mounting pins 206a, 206b, 206c, 206d may be secured to the inner core 202 in a similar manner as the plurality of camera bases 204. In some embodiments, the top or bottom outer shell segments 106, 108 may secure to the inner core 202 in a similar manner as the peripheral outer shell segments 104a, 104b, 104c, 104d.

The plurality of mounting blocks 208a, 208b are configured to couple to a support structure (e.g., mount 116) for the camera system 100. The support structure may provide standing or mounting support and stability for the camera system 100 and can be a variety of mounts (e.g., a monopod, tripod, quadrantpod, wall mount, etc.). Each mounting block 208a, 208b may couple to the support structure via a securing mechanism (e.g., threaded hardware, clamping mechanisms, etc.). In some embodiments, the mounting blocks 208a, 208b may be configured to secure the top or bottom outer shell segments 106, 108 and then secure the support structure via the outer shell segment 106, 108. In some embodiments, the outer shell segments 104a, 104b, 104c, 104d, 106, 108 and the mount are secured separately to the mounting blocks 208a, 208b, without the outer shell segments 104a, 104b, 104c, 104d, 106, 108 and mount directly interacting with each other. The mounting block 208a on the top of the camera assembly 200 may have the same configuration as the mounting block 208b on the bottom of the camera assembly 200 to secure either a top outer shell segment 106 or a bottom outer shell segment 108 to streamline the assembly process of the camera system 100. In this configuration, the orientation of the camera assembly 200 may be reversible, or the orientation of the camera system 100 (once fully assembled) may be attached to the support structure at either end. Each mounting block 208a, 208b extends a certain distance from the inner core 202 such that an attached outer shell segment 106, 108 is appropriately positioned relative to each camera 102. In some embodiments, the outer shell segment 106, 108 is positioned such that an edge of the lens 118 is substantially flush with the inner shell segment 114.

Figure 3:
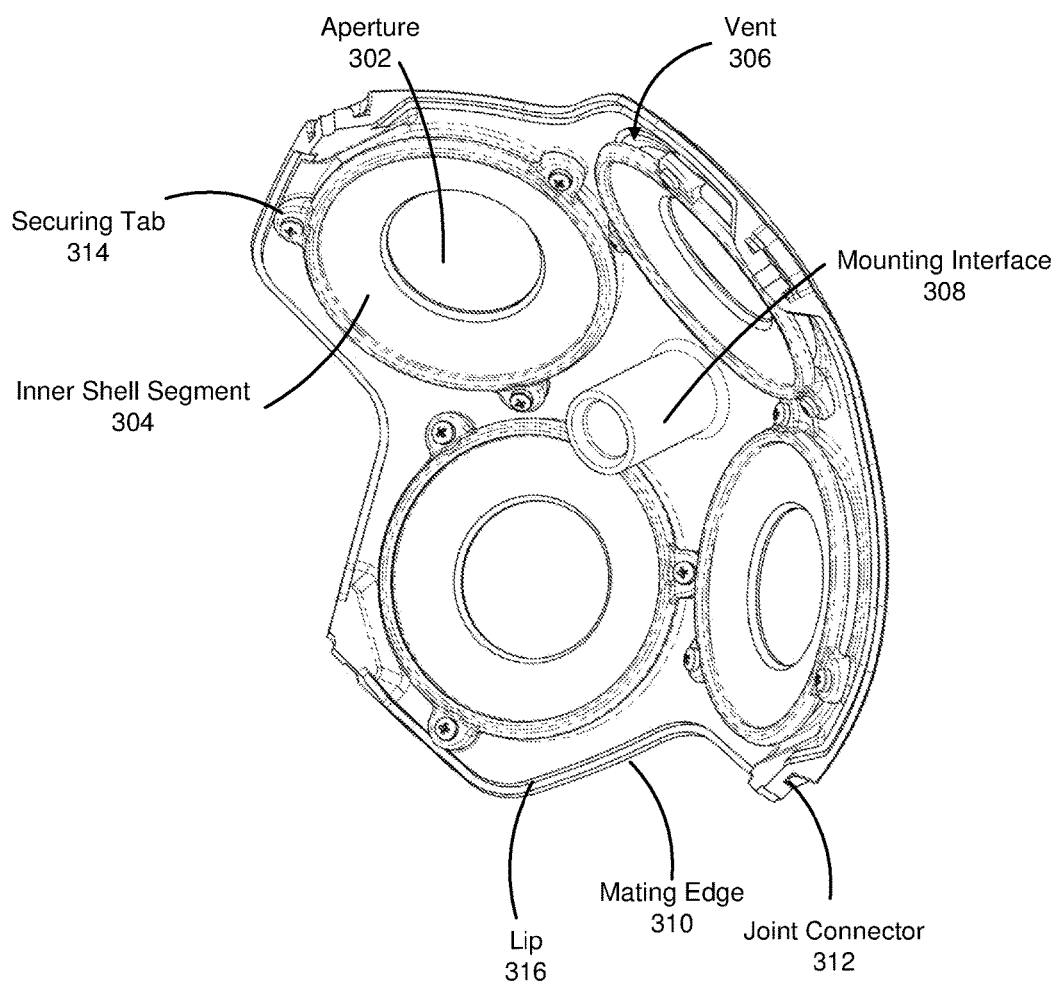
FIG. 3 illustrates an isometric view of an outer shell segment that encloses the plurality of cameras and the inner core of the camera system, according to an embodiment.

FIG. 3 illustrates an isometric view of an outer shell segment 300 that encloses the plurality of cameras 102 and the inner core 202 of the camera system 100, according to an embodiment. Illustrated in FIG. 3 is a peripheral outer shell segment 300 that is configured to secure to a mounting pin of the camera assembly 200, as described with regards to FIG. 2. The peripheral outer shell segment 300 is an embodiment of a peripheral outer shell segment 104a, 104b, 104c, 104d. In the embodiment of FIG. 3, the peripheral outer shell segment 300 comprises four apertures 302, four inner shell segments 304, four vents 306, a mounting interface 308, a plurality of mating edges 310, and four joint connectors 312.

As described with regards to FIG. 1, the apertures 302 are openings that expose a lens of a camera 102 and an inner shell segment 304. In the embodiment of FIG. 3, the peripheral outer shell segment 300 comprises four apertures 302 that each align with a camera 102. Each aperture 302 is circular and is concentric with a ring-shaped inner shell segment 304. In some embodiments, the number of apertures 302 on each peripheral outer shell segment 300 (or top outer shell segment 106 or bottom outer shell segment 108) may vary as would the number of corresponding inner shell segments 304 and resulting vents 306. As illustrated in FIG. 3, the outer diameter of each inner shell segment 304 is slightly larger than the diameter of the aperture 302. The inner shell segment 304 comprises a plurality of securing tabs 314 about its outer perimeter that are configured to receive standard threaded hardware to secure the inner shell segment 304 to an internal surface of the peripheral outer shell segment 300 surrounding the perimeter of the aperture 302. In the embodiment of FIG. 3, the inner shell segment 304 is offset from the internal surface of the peripheral outer shell segment 300. The gap creates a vent 306 through which heat produced by the camera assembly 200 can dissipate. As described with regards to FIG. 1, the inner shell segment 304 may be offset a specified distance from the internal surface of the outer shell segment 300, or the outer diameter of the inner shell segment 304 and the diameter of the aperture 112 may have a specified amount of overlap between the inner shell segment 304 and the outer shell segment 300.

The mounting interface 308 secures the peripheral outer shell segment 300 to a mounting pin (e.g., the mounting pin 206a) secured to the inner core of the camera system 100. In some embodiments, the mounting pin fits loosely with the mounting interface 308. And in some embodiments, an o-ring provides friction, so that the outer shell segment 300 does not fall off, while fasteners are being installed. In the embodiment of FIG. 3, the mounting interface 308 is a tubular protrusion that extends from a central portion of the internal surface of the peripheral outer shell segment 300. The mounting interface 308 is configured to receive a protruding end of a mounting pin. In this configuration, the mounting interface 308 is a female securing interface and the mounting pin is the reciprocal male securing interface. In some embodiments, the configuration may be reversed such that the female securing interface is located on the inner core and the male securing interface is located on the peripheral outer shell segment 300. In the embodiment of FIG. 3, the mounting interface 308 secures the peripheral outer shell segment 300 to the mounting pin and the rest of the camera assembly 200. In some embodiments, the mounting interface 308 may or may not limit rotation of the peripheral outer shell segment 300 once the peripheral outer shell segment 300 is secured. In some embodiments, the top outer shell segment and the bottom outer shell segment may secure to the camera assembly 200 in the same manner as the peripheral outer shell segment 300 or in a different manner than the peripheral outer shell segment 300 to accommodate for the mounting hardware to the mount. As described with regards to FIG. 2, the top outer shell segment and the bottom outer shell segment may attach to the camera assembly 200 via the mounting blocks 208a, 208b and the mount may subsequently attach to the mounting blocks 208a, 208b through the outer shell segments.

The plurality of mating edges 310 are configured to mate with reciprocal mating edges of the adjacent outer shell segments of the camera system 100. In the embodiment of FIG. 3, the plurality of mating edges 310 are along each edge of the peripheral outer shell segment 300. As illustrated in FIG. 3, the geometry of the mating edges 310 is nonlinear, wherein the each mating edge 310 comprises a zigzag pattern of grooves and protrusions that are configured to complement each other. This pattern may help prevent rotation of the outer shell segments relative to each other. In some embodiments, the mating edges 310 may comprise a lip 316 along the edge on the internal surface of the peripheral outer shell segment 300 to better align the outer shell segments relative to each other.

The joint connectors 312 are configured to align and secure the outer shell segments to each other. In the embodiment of FIG. 3, the peripheral outer shell segment 300 comprises four joint connectors 312 with one located at approximately each corner of the peripheral outer shell segment 300. In some embodiments, the number of joint connectors 312 may vary. Each joint connector 312 is structured as a groove and a lip that are configured to mate with a clamping mechanism, which will be discussed with regards to FIGS. 4-5. In the embodiment of FIG. 3, a joint connector 312 of three outer shell segments assemble to form a triangular shaped groove that receives the clamping mechanism. In embodiments of the camera system 100 that have more or less cameras, the configuration of the mating edges 310 and joint connectors 312 may vary in position or geometry.

Figure 4:
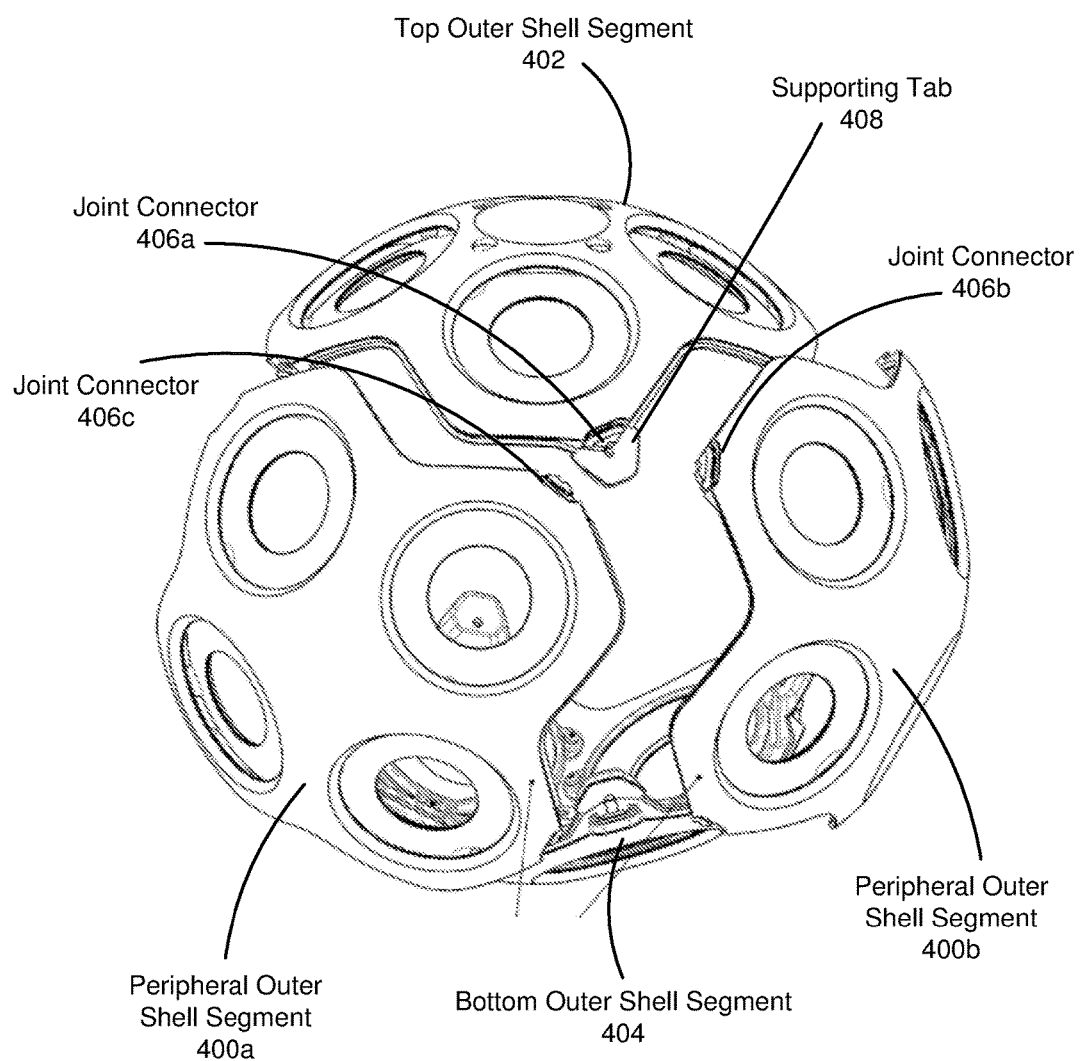
FIG. 4 illustrates an exploded view of segments of the outer shell of the camera system, according to an embodiment.

FIG. 4 illustrates an exploded view of segments of the outer shell of the camera system 100, according to an embodiment. Illustrated in FIG. 4 are two peripheral outer shell segments 400a, 400b, a top outer shell segment 402, and a bottom outer shell segment 404. The peripheral outer shell segments 400a, 400b, the top outer shell segment 402, and the bottom outer shell segment 404 are embodiments of the peripheral outer shell segments 104a, 104b, 104c or 300, the top outer shell segment 106, and the bottom outer shell segment 108, respectively. As described with regards to FIG. 3, the zigzagged mating edges of each outer shell segment 400a, 400b, 402, 404 reciprocally mate with the mating edges of the adjacent outer shell segments. In the embodiment of FIG. 4, when the outer shell segments 400a, 400b, 402, 404 are mated along the mating edges, three joint connectors 406a, 406b, 406c assemble to form a groove that is configured to receive a clamping mechanism that aligns and secures the outer shell segments 400a, 400b, 402, 404 to each other. As shown in FIG. 4, the joint connector 406a of the top outer shell segment 402 and the bottom outer shell segment 404 may differ from the joint connector 406b, 406c of the peripheral outer shell segments 400a, 400b. In the embodiment of FIG. 4, the joint connector 406a of the top outer shell segment 402 and the bottom outer shell segment 404 comprises a supporting tab 408 to support the joint connectors 406b, 406c of the two peripheral outer shell segments 400a, 400b when the joint is assembled. The joint connector 406a of the top outer shell segment 402 and the bottom outer shell segment 404 further comprises a threaded hole configured to receive a standard screw from the clamping mechanism, which will be discussed in greater detail with regards to FIG. 5.

Figure 5:
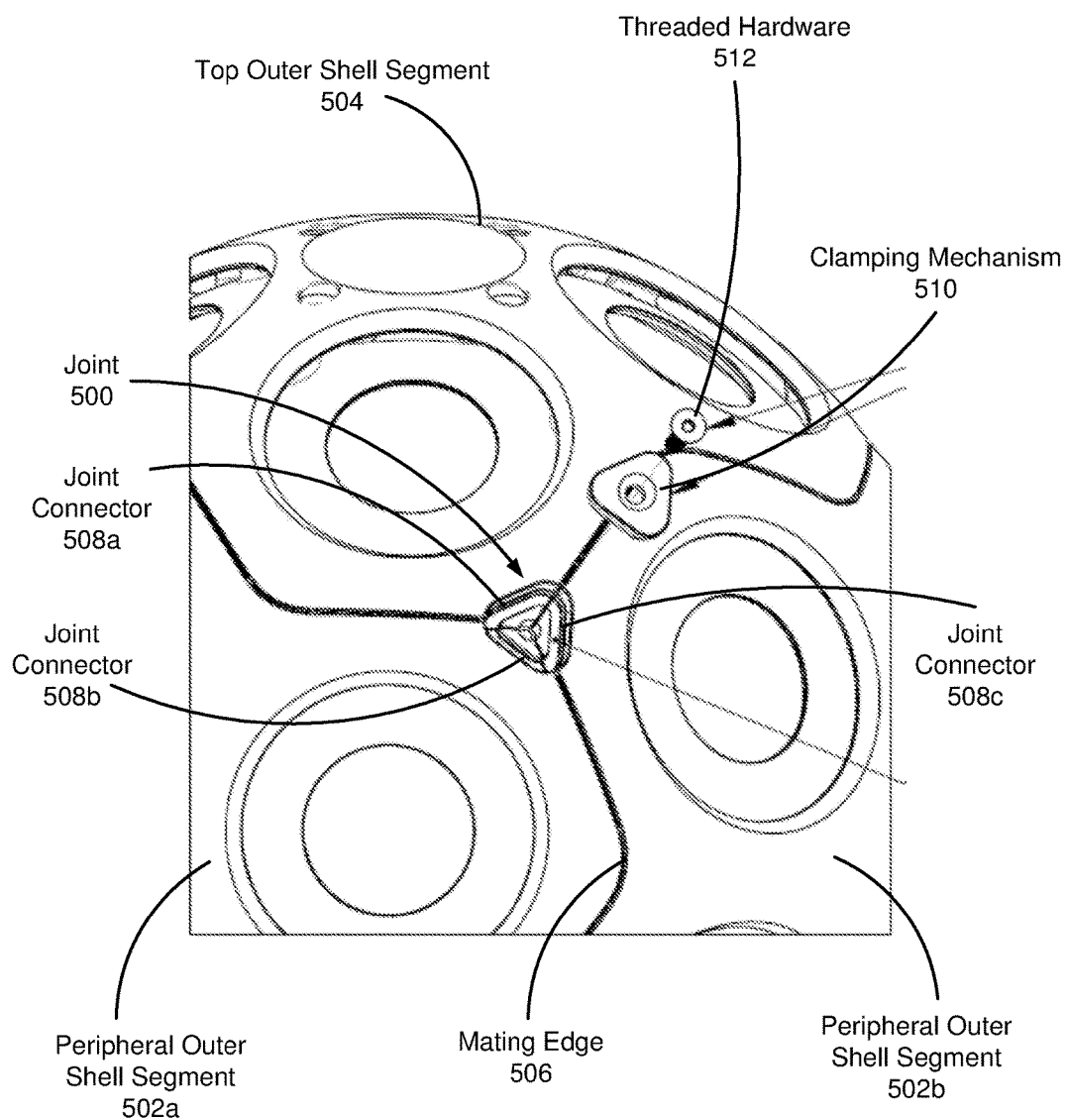
FIG. 5 illustrates a joint between the segments of the outer shell of FIG. 4, according to one embodiment.

FIG. 5 illustrates a joint 500 between the segments of the outer shell of FIG. 4, according to one embodiment. Illustrated in FIG. 5 are two peripheral outer shell segments 502a, 502b and a top outer shell segment 504 that are mated along the mating edges 506. The joint connectors 508a, 508b, 508c of the two peripheral outer shell segments 502a, 502b and a top outer shell segment 504 assemble to create the joint 500. As shown in FIG. 5, the lip of each joint connector 508a, 508b, 508c forms a substantially triangular protrusion that comprises a threaded hole in the middle. Additionally, the groove of each joint connector 508a, 508b, 508c forms a substantially triangular ring configured to receive a component of the clamping mechanism.

The clamping mechanism comprises a substantially triangular component 510 and standard threaded hardware 512. In the embodiment of FIG. 5, a bottom surface of the triangular component 510 comprises a recess configured to receive the triangular protrusion of the mated outer shell segments 502a, 502b, 504 while a lip along the periphery of the bottom surface of the triangular component 510 is configured to fit into the triangular ring created by the mated outer shell segments 502a, 502b, 504. Or said in another way, the joint is a triangular groove, formed by the three outer shell segments 502a, 502b, 504 coming together, and the triangular component 510 includes a triangular rib on the underside that fits into the groove. This configuration prevents rotation of the outer shell segments 502a, 502b, 504 when mated. The triangular component 510 further comprises a hole configured to receive standard threaded hardware 512 (e.g., a screw). To secure the outer shell segments 502a, 502b, 504 together, the triangular component 510 is fit onto the mated joint connectors 508a, 508b, 508c, and the threaded hardware 512 is screwed into the threaded hole formed by the mated joint connectors 508a, 508b, 508c. As the threaded hardware 510 engages the threaded hole, the outer shell segments 502a, 502b, 504 are brought into proper alignment. Once secured, the clamping mechanism 512 may be flush with an outer surface of the outer shell segments 502a, 502b, 504. This configuration creates a rigid structure that prevents vibration of the cameras 102 and allows the cameras 102 to capture quality images and/or video that are used to generate the portion of 3D content in the 3D-360 degree content.

Design Scalability

As previously described, the 3D-360 degree camera system is a scalable system that can be customized according to a user's design requirements. In some embodiments, a workstation may enable a user to input a set of design parameters for a camera system. Design parameters are values of variables that affect design of the camera system. Design parameters may include, e.g., a size of the camera system (form factor), a number of cameras, positioning of the cameras, overlap of the camera fields of view, an environment in which the camera system will be used, some other variable value that affects design of the camera system, or some combination thereof. Based on the input design parameters, the workstation determines a size of the inner core of the system, camera positioning and orientation, a size, number and/or offset distance of the inner shell segments, a size, number, and/or configuration of the outer shell segments, the configuration of the mating edges of the outer shell segments, a number and configuration of the joint connectors of the outer shell segments, a mounting interface for each shell segment, a mounting interface and/or structure for a support structure for the camera system, etc.

In some embodiments, the workstation generates a design for a camera assembly using the design parameters. For example, form factor may be used as an upper limit of size. The camera system can then determine a number of cameras and associated control hardware that fits within a camera assembly that satisfies the desired form factor. The workstation may also determine orientation of the cameras and FOV of the cameras based on the design parameters. For example, a camera assembly having a small form factor may not have room for many lenses, accordingly, to get 360 degree coverage of the local area, lenses with larger FOV are used. For example as described below with regard to FIG. 6, fish eye lenses are used in a small camera assembly having 6 lenses, in contrast 24 WFOV lenses are used in the camera assembly 200 cameras illustrated above in FIG. 2. One advantage of using camera lenses with lower FOV is that the amount of distortion in captured images is much less. Accordingly, processing captured images to make 3D 360 degree content is much easier in WFOV lenses than fisheye lenses. Once the camera orientations are determined, the workstation determines a mounting pin layout, and updates the camera assembly design with the mounting pin layout.

In some embodiments, the workstation designs the outer shell segments based on the designed camera assembly. The workstation determines a number of outer shell segments to generate based on the number of mounting pins on the camera assembly. The workstation determines a number of cameras that are associated with each outer shell segment using the designed camera assembly. The workstation generates apertures in the outer shell segments such that lens of the associated cameras have an unobstructed field of view. In some embodiments, the circumference of one or more of the offsets may be based at least in part on a predicted rate of heat dissipation, a location of the aperture (e.g., an aperture towards the top of the system may be larger than an aperture towards the bottom), or both. The workstation generates inner shell segments for each of the apertures, and determines an offset for each of the inner shell segments. The offset size may be based in part on, e.g., predicted rates of heat dissipation, a location of the inner shell segment on the camera system (e.g., an offset towards the top of the system may be larger than an offset towards the bottom), or both. In this configuration, a camera system having two or more cameras can be conveniently designed according to a user's needs.

Figure 6:
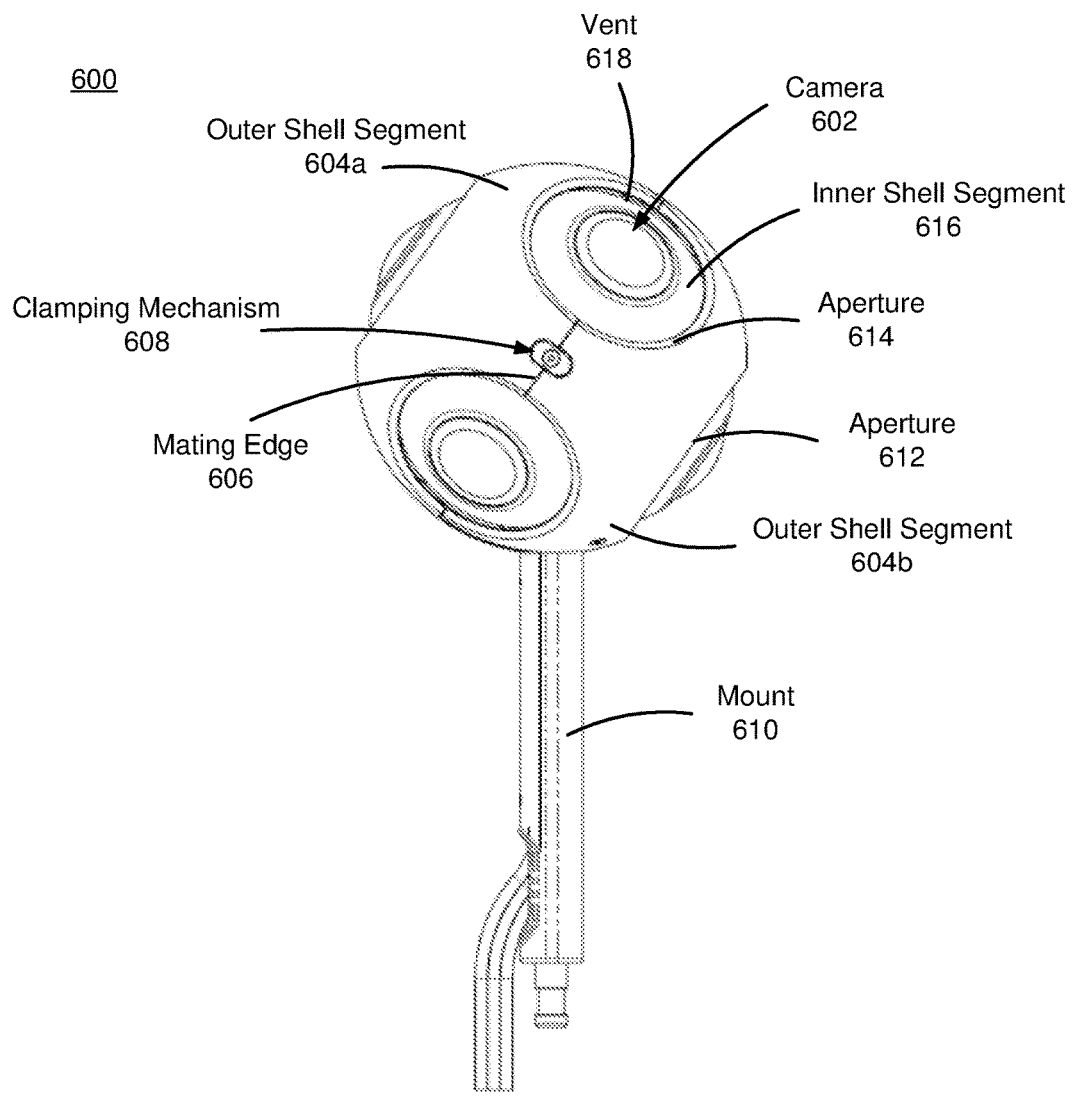
FIG. 6 illustrates an additional embodiment of a scalable virtual reality camera system, according to one embodiment.

FIG. 6 illustrates an additional embodiment of a scalable virtual reality camera system 600, according to one embodiment. The camera system 600 is a scaled embodiment of camera system 100. In the embodiment of FIG. 6, the camera system 600 comprises six cameras 602 (two cameras are not shown) and two outer shell segments 604. As illustrated in FIG. 6, the two outer shell segments 604 are mated along mating edges 606 and secured to each other with clamping mechanism 608. The camera system 600 is coupled to a mount 610.

As illustrated in FIG. 6, the outer shell segments 604 have an increased curvature to accommodate for the decreased number of cameras 602 and smaller form of the camera system 600. In the embodiment of FIG. 6, each outer shell segment 604 comprises an aperture 612 for a first camera 602 and a portion of four apertures 614 for four other cameras 602. Due to the configuration of the camera system 600, the apertures 614 are fully formed once the outer shell segments 604 are assembled. Similar to the embodiment of FIG. 1, the apertures 612, 614 each expose a lens of a camera 602 and an inner shell segment 616. The configuration of the outer shell segments 604 and the inner shell segments 616 create vents 618 to dissipate heat produced by the internal components of the camera system 600. In the embodiment of FIG. 6, the clamping mechanism 608 is substantially oval-shaped and aligns and secures the outer shell segments 604 in a similar manner as described with regards to FIG. 5.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A camera system comprising:
   an inner core configured to mount a plurality of cameras, the inner core comprising a plurality of mounting pins protruding from a surface of the inner core;
   a plurality of outer shell segments having a curvature and configured to mate with adjacent outer shell segments of the plurality of outer shell segments along mating edges to form a spherical exterior around the inner core, each outer shell segment comprising:
   a plurality of apertures that each align with a corresponding camera mounted to the inner core;
   a plurality of inner shell segments that are ring-shaped, each inner shell segment concentrically aligned with an aperture and a corresponding camera, each inner shell segment having an outer diameter that is wider than a diameter of the aperture and attached to the outer shell segment about the perimeter of the aperture, the inner shell segment offset from an internal surface of the outer shell segment;
   a mounting pin interface on the internal surface of the outer shell segment, the mounting pin interface configured to secure to a respective mounting pin protruding from the surface of the inner core; and
   one or more joint connectors positioned along the mating edges of the outer shell segment, each joint connector configured to mate with and secure to at least one joint connector of an adjacent outer shell segment.

2. The camera system of claim 1, wherein each of the plurality of cameras has a field of view that is directed away from the inner core and an optical axis that is in a different direction from other cameras in the plurality of cameras.

3. The camera system of claim 1, wherein a plurality of inner shell segments positioned on an upper portion of the camera system are offset from the internal surface of the outer shell a greater distance than the other inner shell segments.

4. The camera system of claim 1, wherein at least a portion of the plurality of cameras are arranged such that adjacent cameras have overlapping fields of view.

5. The camera system of claim 1, wherein each of the plurality of cameras have a wide field of view ranging between 50 degrees to 120 degrees.

6. The camera system of claim 1, wherein the plurality of cameras are configured to capture a plurality of images in accordance with a global exposure setting.

7. The camera system of claim 1, wherein each outer shell segment is symmetrical.

8. The camera system of claim 1, wherein at least one of the plurality of outer shell segments is configured to couple to a mount.

9. The camera system of claim 1, wherein each of the plurality of cameras is recessed within its corresponding aperture.

10. The camera system of claim 1, further comprising a sensor that is configured to detect a temperature of the camera system.

11. The camera system of claim 10, further comprising an actuator configured to adjust a position of the inner shell segment relative to the internal surface based on the detected temperature.

12. The camera system of claim 1, wherein the mating edges of each outer shell segment comprise a pattern that are configured to complement the mating edges of an adjacent outer shell segment.

13. A camera system comprising:
    an inner core configured to mount a plurality of cameras;
    a plurality of outer shell segments configured to mate with each other along mating edges to form an exterior around the inner core, each outer shell segment comprising:
    a plurality of apertures that each align with a corresponding camera mounted to the inner core; and
    a plurality of inner shell segments that are each aligned with a corresponding aperture, each inner shell segment comprising an opening aligned with a corresponding camera, each inner shell segment offset from an internal surface of the outer shell segment.

14. The camera system of claim 13, wherein the inner core comprises a plurality of mounting pins protruding from a surface of the inner core, and wherein each outer shell segment comprises a mounting pin interface on the internal surface of the outer shell segment, the mounting pin interface configured to secure to a respective mounting pin protruding from the surface of the inner core.

15. The camera system of claim 13, further comprising one or more joint connectors positioned along the mating edges of the outer shell segment, each joint connector configured to mate with and secure to at least one joint connector of an adjacent outer shell segment.

16. The camera system of claim 13, wherein each of the plurality of cameras has a field of view that is directed away from the inner core, each camera having an optical axis that is in a different direction from other cameras in the plurality of cameras.

17. The camera system of claim 13, wherein at least a portion of the plurality of cameras are arranged such that adjacent cameras have overlapping fields of view.

18. The camera system of claim 13, wherein the plurality of cameras are configured to capture a plurality of images in accordance with a global exposure setting.

19. The camera system of claim 13, further comprising a plurality of sensors that are configured to detect an internal or external temperature of the camera system.

20. The camera system of claim 19, further comprising an actuator configured to adjust a position of the inner shell segment relative to the internal surface based on a detected temperature.

* * * * *